United States Patent
Fujii

(10) Patent No.: US 7,240,837 B2
(45) Date of Patent: Jul. 10, 2007

(54) IC-TAG READ-WRITE APPARATUS

(75) Inventor: Tatsuya Fujii, Nishinomiya (JP)

(73) Assignee: Ricoh Company, Ltd., Tokyo (JP)

( * ) Notice: Subject to any disclaimer, the term of this patent is extended or adjusted under 35 U.S.C. 154(b) by 244 days.

(21) Appl. No.: 11/040,558

(22) Filed: Jan. 21, 2005

(65) Prior Publication Data

US 2005/0167497 A1    Aug. 4, 2005

(30) Foreign Application Priority Data

Jan. 23, 2004   (JP)   ............................. 2004-015687

(51) Int. Cl.
*G06K 7/08*   (2006.01)
(52) U.S. Cl. ..................... 235/451; 235/492; 340/572.2
(58) Field of Classification Search ................ 235/451, 235/492, 485, 440, 435, 375; 340/572.2, 340/10.5, 572.1, 572.4
See application file for complete search history.

(56) References Cited

U.S. PATENT DOCUMENTS

| | | | | |
|---|---|---|---|---|
| 5,212,373 | A * | 5/1993 | Fujioka et al. | ............... 235/492 |
| 6,223,990 | B1 * | 5/2001 | Kamei | ......................... 235/492 |
| 7,000,837 | B2 * | 2/2006 | Akiho et al. | ................. 235/451 |
| 7,026,935 | B2 * | 4/2006 | Diorio et al. | ............ 340/572.2 |
| 2005/0001031 | A1 * | 1/2005 | Akiho et al. | ................. 235/451 |
| 2006/0022803 | A1 * | 2/2006 | Akiyama et al. | ........ 340/10.34 |
| 2006/0220863 | A1 * | 10/2006 | Koyama | .................. 340/572.1 |

FOREIGN PATENT DOCUMENTS

| | | |
|---|---|---|
| JP | 7-200749 | 8/1995 |
| JP | 2002-259921 | 9/2002 |

* cited by examiner

*Primary Examiner*—Thien M. Le
*Assistant Examiner*—Edwyn Labaze
(74) *Attorney, Agent, or Firm*—Cooper & Dunham LLP

(57) ABSTRACT

A radio data communication apparatus includes first antennas, modulation circuits, an oscillating circuit, a switch circuit, a memory, and a control circuit. The first antennas perform a one-to-one radio communication with second antennas of IC tags having different communication frequencies. The one-to-one radio communication is carried out based on a resonance frequency uniquely assigned to each one of combinations between the first antennas and the second antennas. The memory stores communication information of each IC tag, including an assigned resonance frequency. The control circuit reads a resonance frequency assigned to a second antenna belonging to a target IC tag, generates the control signal such that the switch circuit selects a specific carrier wave having a frequency substantially equal to the resonance frequency read from the memory, and transmits the specific carrier wave and data to be transmitted in synchronism with each other to a corresponding modulating circuit.

13 Claims, 5 Drawing Sheets

IC-TAG READ-WRITE APPARATUS

BACKGROUND

1. Field

The present specification describes an IC-tag read-write apparatus, and more particularly to an IC-tag read-write apparatus capable of performing a stable radio data communication with an IC tag.

2. Discussion of the Background

A typical structure of a background IC (integrated circuit) tag read-and-write apparatus 100 is illustrated in FIG. 1. The background IC-tag read-and-write apparatus 100 communicates with a plurality of IC tags including an IC tag 110 and an IC tag 120 by performing a data read and write operation using radio waves. The background IC-tag read-write apparatus 100 of FIG. 1 includes an antenna ANTa, an oscillating circuit (OSC) 101, a controlling circuit (CONT) 102, and a signal modulating circuit (MOD) 103. The IC tag 110 of FIG. 1 includes an antenna ANTb1 and a signal modulating circuit (MOD) 111. The IC tag 120 of FIG. 1 includes an antenna ANTb2 and a signal modulating circuit (MOD) 121.

The oscillating circuit 101 generates and outputs a carrier wave to perform a radio communication with the IC tags such as the IC tags 110 and 120. The frequency of the carrier wave is generally 13.56 MHz. For some special applications, it may be lower in a range of from 120 kHz to 500 kHz, or even a microwave of 2.4 GHz.

In a case of writing data into the IC tag 110, for example, the background IC-read read-write apparatus 100 conducts the operations in the following manner. The controlling circuit 102 receives the carrier wave from the oscillating circuit 101 and performs an input and output control of a data signal to be superimposed on the carrier wave. The signal modulation circuit 103 receives the carrier wave and data signal output from the controlling circuit 102 and conducts a signal modulation to the carrier wave in accordance with the data signal. The modulated signal is transmitted by radio through the antenna ANTa. The IC tag 110 receives the radio signal sent from the background IC-tag read-write apparatus 100 and demodulates the received signal with the signal modulation circuit 111.

In a case of reading data front the IC tag 110, for example, the background IC-read read-write apparatus 100 conducts the operations in the following manner. The background IC-tag read-write apparatus 100 sends a select command and a read command to both IC tags 110 and 120. The select command is to select the IC tag 110, for example, and the read command is to instruct the selected IC tag to output the data desired. Upon receiving the select and read commands, the IC tag 110 is activated and modulates the carrier wave with the signal modulation circuit 111. Then, the IC tag 110 sends the data requested by the read command and transmits by radio the carrier wave together with the requested data through the antenna ANTb1. The background IC-tag read-write apparatus 100 receives the radio signal with the antenna ANTa, demodulates the received signal, and retrieves the data requested. In this event, the IC tag 120 is not selected and is not activated, so that it does not output the data desired by the read command. Accordingly, to read data from the IC tag 120, for another example, the background IC-tag read-write apparatus 100 needs to send a select command to the IC tag 120 before the read command so as to select the IC tag 120.

SUMMARY

This patent specification describes a novel radio data communication apparatus. In one example, a novel radio data communication apparatus includes a plurality of first antennas, a plurality of modulation circuits, an oscillating circuit, a switch circuit, a memory, and a control circuit. The plurality of first antennas are configured to perform a one-to-one radio communication with a plurality of second antennas of IC tags having communication frequencies different from each other. The one-to-one radio communication being carried out based on a resonance frequency uniquely assigned to each one of combinations between, the plurality of first antennas and the plurality of second antennas. The plurality of modulation circuits are connected to the plurality of first antennas on a one-to-one basis. Each one of the plurality of modulation circuits is configured to perform a modulation function and a demodulation function. The modulation function modulates a carrier wave in accordance with data to be transmitted and transmitting the modulated carrier wave to a specific IC tag among the plurality of IC tags through a corresponding one of the plurality of first antennas. The demodulation function demodulates a modulated carrier wave which has been sent from a specific IC tag out of the plurality of IC tags via a corresponding one of the plurality of first antennas. The oscillating circuit is configured to generate and output a plurality of carrier waves having frequencies different from each other. The frequencies are predetermined in accordance with a specific factor. The switch circuit is configured to exclusively select and output one of the plurality of carrier waves output from the oscillating circuit in accordance with a control signal input thereto. The memory stores communication information of each one of the plurality of IC tags, including a resonance frequency assigned thereto. The control circuit is configured to read from the memory a specific resonance frequency assigned to one of the plurality of second antennas belonging to a target IC tag among the plurality of IC tags, to generate the control signal such that the switch circuit selects, from among the plurality of carrier waves, a specific carrier wave having a frequency, out of the predetermined frequencies, substantially equal to the specific resonance frequency read from the memory, and to transmit the specific carrier wave selected by the switch circuit and data to be transmitted in synchronism with each other a corresponding one of the plurality of modulating circuits.

The specific factor for predetermining the frequencies may include environmental conditions of places where the plurality of IC tags are mounted.

The specific factor for predetermining the frequencies may include materials of places where the plurality of IC tags are mounted.

The control circuit may be configured to generate the control signal such that the switching circuit selects a carrier wave having a relatively low frequency when a place where the plurality of IC tags is made of metal or conductive material and a carrier wave having a relatively high frequency when the place is made of non-metal or non-conductive material.

Each one of the plurality of first antennas may be configured to have a frequency substantially equal to a specific resonance frequency of a corresponding one of the plurality of second antennas and is arranged close to the corresponding one of the plurality of second antennas.

This patent specification further describes a novel data communication apparatus. In one example, a novel data communication apparatus includes at least one component and a radio data communication mechanism. The at least one component performs a predetermined function and to which at least one IC tag is installed. The radio data communication mechanism includes a plurality of first antennas, a plurality of modulation circuits, an oscillating circuit, a switch circuit, a memory, and a control circuit. The plurality of first antennas are configured to perform a one-to-one radio communication with a plurality of second antennas of IC tags having communication frequencies different from each other. The one-to-one radio communication being carried out based on a resonance frequency uniquely assigned to each one of combinations between the plurality of first antennas and the plurality of second antennas. The plurality of modulation circuits are connected to the plurality of first antennas on a one-to-one basis. Each one of the plurality of modulation circuits is configured to perform a modulation function and a demodulation function. The modulation function modulates a carrier wave in accordance with data to be transmitted and transmitting the modulated carrier wave to a specific IC tag among the plurality of IC tags through a corresponding one of the plurality of first antennas. The demodulation function demodulates a modulated carrier wave which has been sent from a specific IC tag out of the plurality of IC tags via a corresponding one of the plurality of first antennas. The oscillating circuit is configured to generate and output a plurality of carrier waves having frequencies different from each other. The frequencies are predetermined in accordance with a specific factor. The switch circuit is configured to exclusively select and output one of the plurality of carrier waves output from the oscillating circuit in accordance with a control signal input thereto. The memory stores communication information of each one of the plurality of IC tags, including a resonance frequency assigned thereto. The control circuit is configured to read from the memory a specific resonance frequency assigned to one of the plurality of second antennas belonging to a target IC tag among the plurality of IC tags, to generate the control signal such that the switch circuit selects, from among the plurality of carrier waves, a specific carrier wave having a frequency, out of the predetermined frequencies, substantially equal to the specific resonance frequency read from the memory, and to transmit the specific carrier wave selected by the switch circuit and data to be transmitted in synchronism with each other a corresponding one of the plurality of modulating circuits.

Each one of the plurality of first antennas may be configured to have a frequency substantially equal to a specific resonance frequency of a corresponding one of the plurality of second antennas and is arranged close to the corresponding one of the plurality of second antennas.

At least one of the plurality of first antennas corresponding to the at least one IC tag may be mounted to a member to which the at least one IC tag is mounted.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
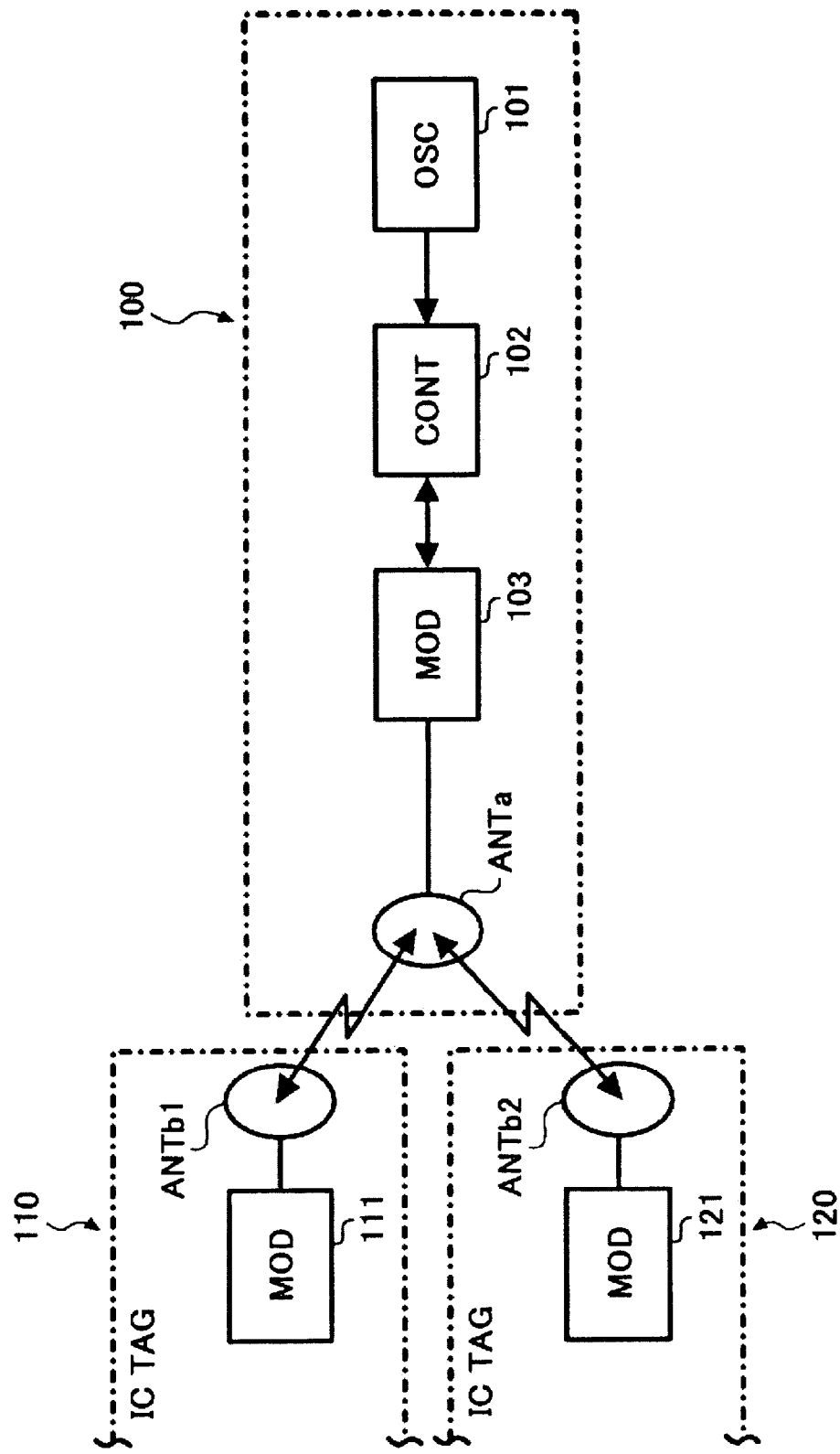
FIG. 1 is an illustration of a background IC-tag read-write apparatus.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, an IC-tag (integrated circuit tag) read-write apparatus 1 according to an exemplary embodiment is explained.

Figure 2:
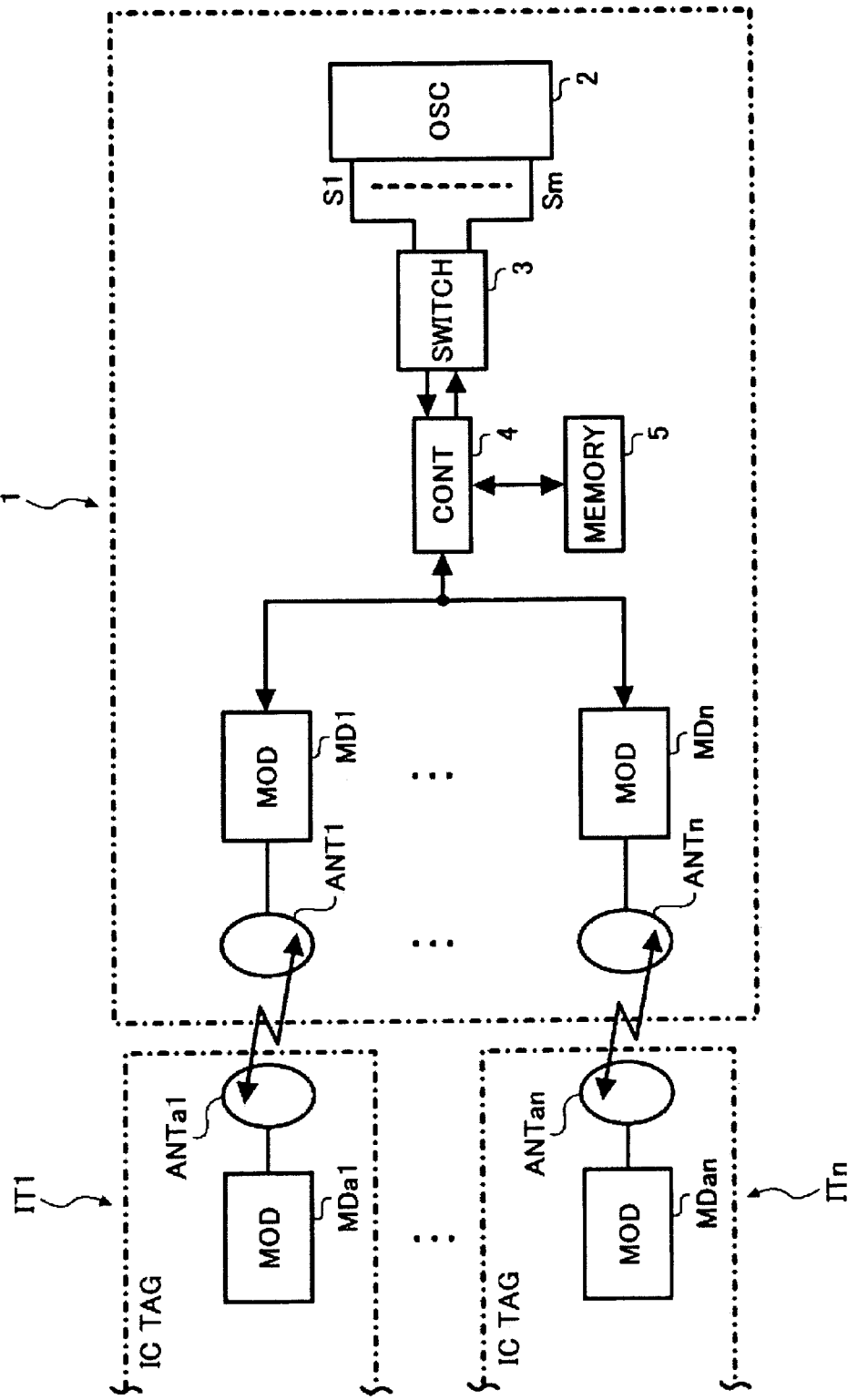
FIG. 2 is an illustration of an IC-tag read-write apparatus according to an embodiment.

In FIG. 2, the IC-tag read-write apparatus 1 includes an oscillator (OSC) 2, a switch circuit (SWITCH) 3, a controller (CONT) 4, a memory 5, a plurality of modulation circuits (MOD) MD1 to MDn, and a plurality of antennas ANT1—ANTn. Suffix n given to MD and ANT is a positive integer greater than 1.

FIG. 2 also illustrates a plurality of IC (integrated circuit) tags IT1 to ITn, in which a suffix n given to IT is a positive integer greater than 1. The plurality of IC tags IT1 to ITn include a plurality of modulation circuits (MOD) MDa1 to MDan, respectively, and a plurality of antennas ANTa1 to ANTan, respectively. Suffix n given to MDa and ANTa is a positive integer greater than 1.

In the IC-tag read-write apparatus 1 of FIG. 2, the oscillator 2 generates a plurality of carder waves including carrier waves S1 to Sm having frequencies F1 to Fm different from each other, in which the suffix in provided to S and F is a positive integer greater than 1 and equal to or smaller than n. The switch circuit 3 selectively outputs one of the carrier waves output from the oscillator 2 in accordance with a control signal input from the controller 4. The controller 4 controls the switching operation of the switch circuit 3 through the control signal, and also controls input and output of the data signal to be superimposed on the carrier wave.

As described above, the switch circuit 3 exclusively selects one of the carrier waves S1–Sm, output from the oscillator 2, in accordance with the control signal received from the controller 4 and outputs the selected carrier wave to the controller 4. The memory-5 stores data representing parameters including communication frequencies and communication protocols pertinent to the IC tags IT1–ITn. The controller 4 selects one of the carrier waves based on the data stored in the memory, and controls the switch circuit 3, to output the selected carrier wave.

Each of the modulation circuits MD1–MDn receives the carrier wave and the data signal, output from the controller 4, performs a predetermined modulation to the carrier wave in accordance with the data signal, and sends the modulated signal to the corresponding antenna.

On the other hand, each of the modulation circuits MD1-MDn performs a predetermined demodulation to a signal received from outside via the corresponding antenna out of the antennas ANT1–ANTn and outputs a resultant demodulated signal to the controller 4. The controller 4 extracts the desired data from the demodulated signal.

In the IC tags IT1–ITn, each of the antennas ANTa1–ANTan is arranged at a position relatively close to the corresponding one of the antennas ANT1–ANTn. An antenna ANTk, one of the plurality of antennas ANT1 to ANTn of the IC-tag read-write apparatus, and an antenna ANTak, one of the plurality of antennas ANTa1 to ANTan of the IC tags, have a resonance frequency which is commonly set to a k-th frequency. In this respect, the IC tag ITk is basically the one communicating with the IC-tag read-write apparatus 1 via the antenna ANTk. The suffix k provided to ANT and ANTa is a positive integer greater than 1 and smaller than n.

However, it is possible that more than one antennas of the IC tag side can be disposed in the vicinity of one antenna of the IC-tag read-write apparatus side. Thus, it becomes possible that a pair of the modulation circuit and the antenna of the IC-tag read-write apparatus side communicates with the number of IC tags, when the IC tags allows the communications with the same frequency.

In communications of the IC-tag read-write apparatus 1 with the IC tag ITk, the controller. 4 reads data stored in the memory 5 for the resonance frequency of the IC tag ITk and sends the read data to the switch circuit 3. The switch circuit 3 selects a carrier wave having a frequency in accordance with such data sent from the controller 4 and sends the selected carrier wave to the controller 4. The controller 4 further reads from the memory 5 the communication protocols data for selecting the IC tag ITk and data representing the communications protocols, and sends the input carrier wave together with the read data to the modulation circuit MDk.

The modulation circuit MDk performs the predetermined modulation to the carrier wave in accordance with the data signal and sends the resultant signal to the antenna ANTk. The signal thus transmitted by radio waves from the antenna ANTk is received by the antenna ANTak of the IC tag ITk, and the received signal is demodulated by the modulation circuit MDak.

It is possible to configure the controller 4 to prohibit any other different antenna from transmitting by radio a carrier wave having the frequency same as the one transmitted from the antenna ANTk.

In a case the controller 4 does not have such a prohibition function as described above, the signal sent to the modulation circuit MDk may also be sent to another modulation circuit in the IC-tag read-write apparatus 1 and accordingly the carrier wave having the K-th frequency may be transmitted by radio from another antenna which is different from the antenna ANTk. However, the resonance frequency of such another antenna is not the k-th frequency and therefore the radio waves transmitted from an antenna other than the antenna ANTk is weak for the radio communication.

Further, the antennas ANTa1–ANTan are in a similar situation. Namely, the resonance frequencies of other antennas than the ANTak are not the k-th frequency and therefore the radio waves transmitted from other antennas than the antenna ANTak are weak for the radio communications.

In order to communicate with an IC tag other than the IC tag ITk (e.g., the IC tag IT2), the controller 4 instructs the switch circuit 3 to select the carrier wave S2 having the second frequency corresponding to the IC tag IT2. After the selection, the controller 4 sends the requisite data stored in the memory 5 together with the carrier wave S2 of the second frequency to the modulation circuit MD2. The requisite data represents parameters including the selection data and the communication protocols pertinent to the IC tag IT2. Thus, the IC-tag read-write apparatus 1 achieves the communications with a selected IC tag, i.e., the IC tag IT2. In this way, the IC-tag read-write apparatus 1 can selectively communicate with any one of the IC tags ITa1–ITan.

Since the communications rate between the IC tag and the IC-tag read-write apparatus is increased with an increase of carrier wave frequency, it is preferable to change the frequency used for communications between the IC tag and the IC-tag read-write apparatus in accordance with the environmental factors surrounding the IC tag or a required communications frequency.

When the place for mounting the IC tag has a metal or conductive surface, it is preferable to use a low frequency in the range of from 120 kHz to 500 kHz, which is insusceptible to such material. On the other hand, when the IC tag is mounted on a place of a nonmetal or electrical insulating material, it is preferable to use a high frequency such as 13.56 MHz which allows a high speed communication.

It is also possible to use the frequency such as 900 kHz or 2.4 GHz, for example, depending upon the required communications speed and the environments with respect to the place for mounting the IC tag.

Figure 3:
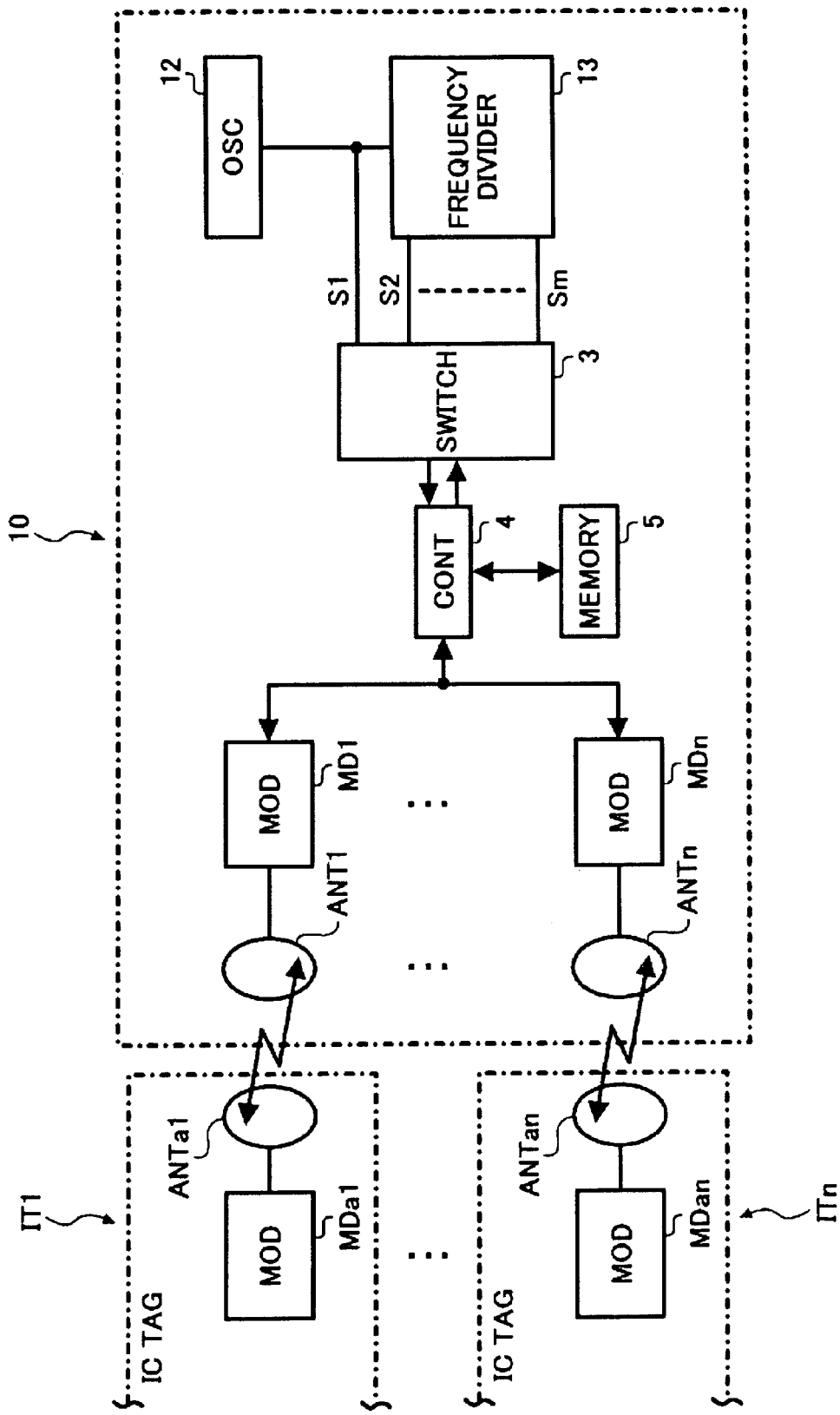
FIGS. 3 and 4 are illustrations of IC-tag read-write apparatuses according to other embodiments which communicate with a plurality of IC tags.

Referring to FIG. 3, an IC-tag read-write apparatus 10 according to another embodiment is explained. The IC-tag read-write apparatus 10 of FIG. 3 is similar to the IC-tag read-write apparatus 1, except for an oscillator 12 and a frequency divider 13. The oscillator 12 generates a carrier wave S1 and outputs it to the switch circuit 3 and the frequency divider 13. The frequency divider 13 receives the carrier wave S sent from the oscillator 12, and divides the carrier wave S1 using a plurality of different frequencies into a plurality of carrier waves S2 to Sm having frequencies different from each other. As a result, the carrier waves S2 to Sm are output from the frequency divider 13 and are sent to the switch circuit 3. Thus, in the IC-tag read-write apparatus 10, the switch circuit 3 can receive the carrier waves S1 to Sm, as in the case of the IC-tag read-write apparatus 1 shown in FIG. 2.

After thus supplying the carrier waves S1 to Sm to the switch circuit 3, the IC-tag read-write apparatus 10 performs the operations similar to those of the IC-tag read-write apparatus 1 of FIG. 2 to read data from and to write data to the IC tags IT1 to ITn.

Figure 4:
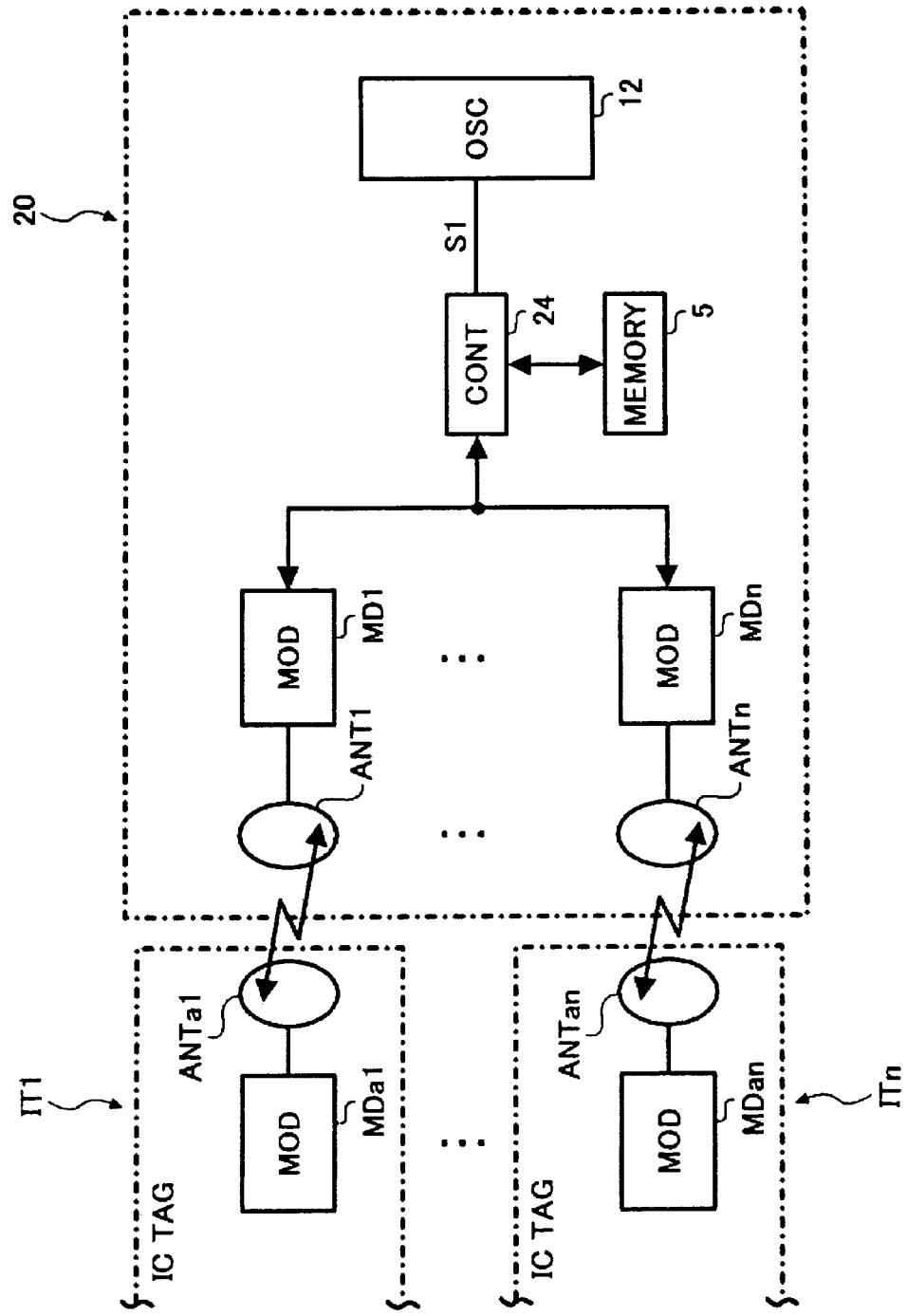

As an alternative, the operations performed by the the frequency divider 13 and the switch circuit 3 may be conducted by a software program. In this case, the IC-tag read-write apparatus may be embodied as an IC-tag read-write apparatus 20 having a structure as illustrated in FIG. 4. As illustrated in FIG. 4, the IC-tag read-write apparatus 20 is similar to the IC-tag read-write apparatus 10 of FIG. 3, except for a controller 24 which replaces the frequency divider 13, the switch circuit 3, and the controller 4.

In the IC-tag read-write apparatus 20 of FIG. 4, the controller 24 is configured to receive the carrier wave S1 output from the oscillator 22 and to generate the carrier waves S2-Sm. When the IC-tag read-write apparatus 20 communicates with the IC tag ITk, in which k is a positive integer equal to or greater than 1 and equal to or smaller than n, the controller 24 reads data of resonance frequency of the IC tag ITk stored in the memory 5 and generates a carrier wave having the resonance frequency read from the memory 5. The controller 24 further reads select data representing the IC tag ITk and also information including communication protocols, from the memory 5. Then, the controller 24 sends the carrier wave with the resonance frequency and the data read from the memory 5 to the modulation circuit MDk. For example, when the carrier wave having the resonance frequency of the IC tag ITk stored in the memory 5 is the carrier wave S, the controller 24 sends the select data of the IC tag ITk together with the information including the communications protocols read from the memory 5 to the modulation circuit MDk.

Figure 5:
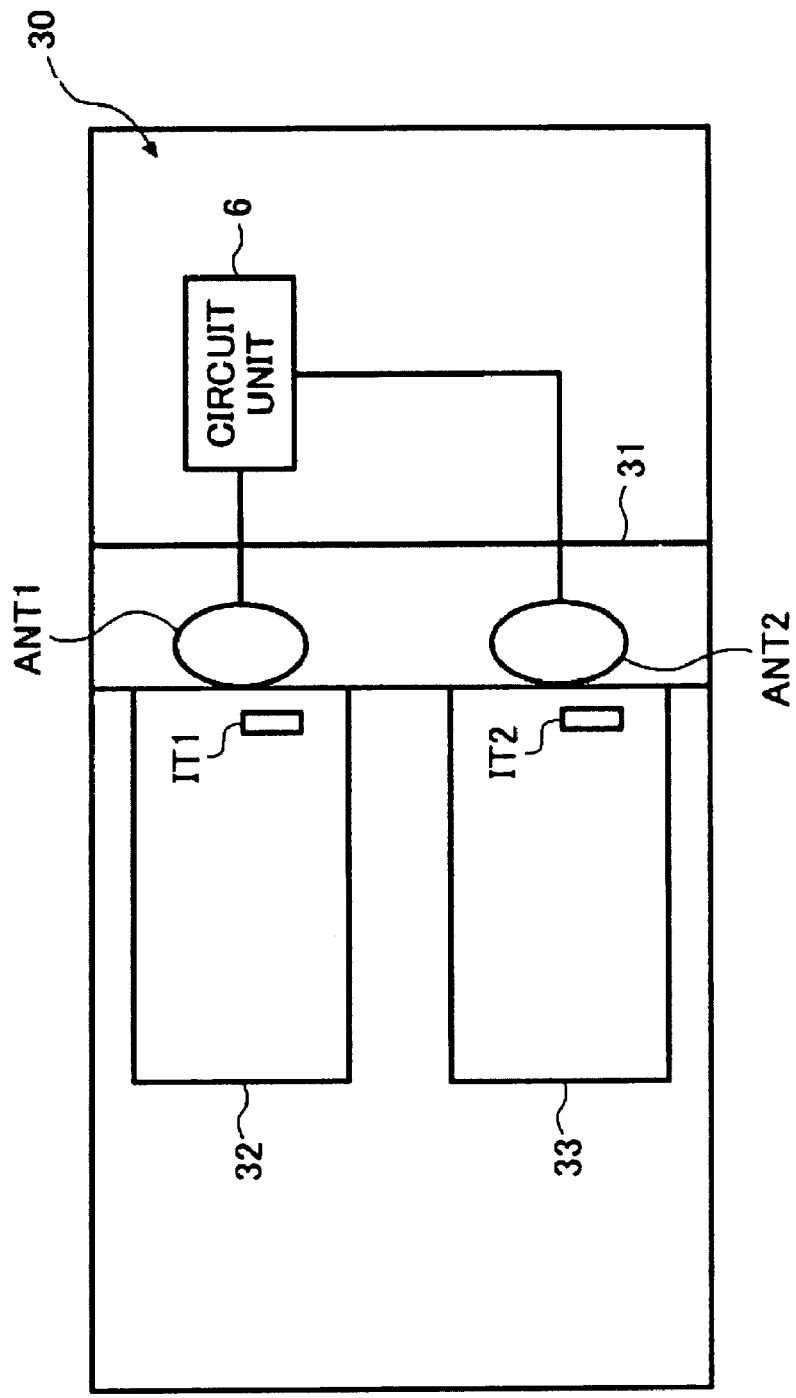
FIG. 5 is an illustration of an apparatus containing the IC-tag read-write apparatus of FIG. 2.

Referring to FIG. 5, an exemplary apparatus 30 is explained, which employs the IC-tag read-write apparatus according to the present embodiment and conducts the radio data communications using the IC-tag read-write apparatus. The apparatus 30 can be a digital copier, a printer, or the like capable of performing the radio data communications using the IC-tag read-write apparatus 1 of FIG. 2, for example. The IC-tag read-write apparatus used may alternatively be one of those shown in FIGS. 3 and 4, for example. In FIG. 5, a reference numeral 6 denotes a circuit unit representing the oscillator 2, the switch circuit 3, the controller 4, and the memory 5 of the IC-tag read-write apparatus 1. In a case the IC-tag read-write apparatus 10 of FIG. 3 is applied, the circuit unit 6 represents the oscillator 12, the frequency divider 13, the switch circuit 3, the controller 4, and the memory 5. In a case the IC-tag read-write apparatus 20 of FIG. 4 is applied, the circuit unit 6 represents the oscillator 12, the controller 24, and the memory 5.

In FIG. 5, two sets of the antennas AN1 and ANT2 and the IC tages IT1 and IT2 are representatively illustrated for the sake of simplicity; however, more than two sets can be applied since the IC-tag read-write apparatus 1 includes the antennas ANT1 to ANTn.

As illustrated in FIG. 5, the apparatus 30 includes a mounting member 31 and two components 32 and 33. It is possible to provide more components than the two components 32 and 33. The components 32 and 33 are those having status parameters varying over time, namely, toner containers, for example. Status parameters of the components 32 and 33 which varies over time include a remaining amount of toner in the toner container, for example. These status parameters are monitored to maintain the apparatus 30 in an operable condition. To monitor the parameters, the IC tags IT1 and IT2 are fixed to the components 32 and 33, respectively, and the IC-tag read-write apparatus 1 is arranged to receive information of the status parameters of the components 32 and 33 through the IC tags IT1 and IT2 via radio data communications.

As illustrated in FIG. 5, the component 32 is mounted to the mounting member 31 and the position of the IC tag IT1 fixed to the component 32 is preferably close to the mounting member 31. The antenna ANT1 of the IC-tag read-write apparatus 1 communicating with the IC tag IT1 is fixed to the mounting member 31 at a place as close as possible to the IC tag IT1. In a similar manner, the IC tag IT2 and the antenna ANT2 of the IC-tag read-write apparatus 1 are mounted to the component 33 and the Mounting member 31, respectively.

When the components 32 and 33 are made of a nonmetal or electrical insulating material, the IC-tag read-write apparatus 1 can select a relatively high frequency such as 13.56 MHz or the like as the first frequency for the communication with the IC tags IT1 and IT2 so as to perform a high speed data transmission. When the components 32 and 33 are made of a metal or conductive material, a relatively low frequency insusceptible to such a metal or conductive material is selected in the range of from 120 kHz to 500 kHz. It is further possible to use other frequency than the above, such as 900 kHz or 2.4 GHz, for example, depending upon a situation required based on the material of the components 32 and 33 and the data communication speed.

Thus, in the apparatus 30, the IC-tag read-write apparatus 1 can selectively use one of the carrier waves susceptible to the environments surrounding the IC tags IT1 and IT2, for example. Accordingly, it becomes possible to make sure that the IC-tag read-write apparatus 1 properly performs the radio data communications with the target IC tags. Furthermore, when the influences by the environments are negligible, the IC-tag read-write apparatus 1 can use a carrier wave having a relatively high frequency so as to be able to increase the radio data communications speed.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. 2001-015687 filed on Jan. 23, 2004, in the Japan Patent Office, the entire contents of which are incorporated by reference herein.

What is claimed is:

1. A radio data communication apparatus, comprising:
    a plurality of first antennas configured to perform a one-to-one radio communication with a plurality of second antennas of IC tags having communication frequencies different from each other, the one-to-one radio communication being carried out based on a resonance frequency uniquely assigned to each one of combinations between the plurality of first antennas and the plurality of second antennas;
    a plurality of modulation circuits connected to the plurality of first antennas on a one-to-one basis, and each configured to perform a modulation function for modulating a carrier wave in accordance with data to be transmitted and transmitting the modulated carrier wave to a specific IC tag among the plurality of IC tags through a corresponding one of the plurality of first antennas and a demodulation function for demodulating a modulated carrier wave which has been sent from a specific IC tag out of the plurality of IC tags via a corresponding one of the plurality of first antennas;
    an oscillating circuit configured to generate and output a plurality of carrier waves having frequencies different from each other, the frequencies being predetermined in accordance with a specific factor;
    a switch circuit configured to exclusively select and output one of the plurality of carrier waves output from the oscillating circuit in accordance with a control signal input thereto;
    a memory storing communication information of each one of the plurality of IC tags, including a resonance frequency assigned thereto; and
    a control circuit configured to read from the memory a specific resonance frequency assigned to one of the plurality of second antennas belonging to a target IC tag among the plurality of IC tags, to generate the control signal such that the switch circuit selects, from among the plurality of carrier waves, a specific carrier wave having a frequency, out of the predetermined frequencies, substantially equal to the specific resonance frequency read from the memory, and to transmit the specific carrier wave selected by the switch circuit and data to be transmitted in synchronism with each other to a corresponding one of the plurality of modulating circuits,
    wherein the predetermined frequencies are within the radio wave spectrum.

2. A radio data communication apparatus of claim 1, wherein the specific factor for predetermining the frequencies includes enviromnental conditions of places where the plurality of IC tags are mounted.

3. A radio data communication apparatus of claim 1, wherein the specific factor for predetermining the frequencies includes materials of places where the plurality of IC tags are mounted.

4. A radio data communication apparatus of claim 1, wherein the control circuit is configured to generate the control signal such that the switching circuit selects a carrier wave having a relatively low frequency when a place where the plurality of IC tags is made of metal or conductive material and a carrier wave having a relatively high frequency when the place is made of non-metal or non-conductive material.

5. A radio data communication apparatus of claim 1, wherein each one of the plurality of first antennas is configured to have a frequency substantially equal to a specific resonance frequency of a corresponding one of the plurality of second antennas and is arranged close to the corresponding one of the plurality of second antennas.

6. A radio data communication apparatus of claim 1, wherein the predetermined frequencies are in a range of 3 kHz to 300 GHz.

7. A radio data communication apparatus of claim 1, wherein the frequency of the specific carrier is in a range of 120 kHz to 2.4 kHz.

8. A radio data communication apparatus of claim 1, wherein the frequency of the specific carrier is in a range of 120 kHz to 900 kHz.

9. A radio data communication apparatus of claim 1, wherein the frequency of the specific carrier is in a range of 120 kHz to 500 kHz.

10. A radio data communication apparatus of claim 1, wherein the frequency of the specific carrier is in a range of 900 kHz to 2.4 GHz.

11. A data communication apparatus, comprising:
at least one component for performing a predetermined function and to which at least one IC tag is installed; and
a radio data communication mechanism which comprises:
a plurality of first antennas configured to perform a one-to-one radio communication with a plurality of second antennas of IC tags having communication frequencies different from each other, the IC tags including the at least one IC tag, and the one-to-one radio communication being carried out based on a resonance frequency uniquely assigned to each one of combinations between the plurality of first antennas and the plurality of second antennas;
a plurality of modulation circuits connected to the plurality of first antennas on a one-to-one basis, and each configured to perform a modulation function for modulating a carrier wave in accordance with data to be transmitted and transmitting the modulated carrier wave to a specific IC tag among the plurality of IC tags through a corresponding one of the plurality of first antennas and a demodulation function for demodulating a modulated carrier wave which has been sent from a specific IC tag out of the plurality of IC tags via a corresponding one of the plurality of first antennas;
an oscillating circuit configured to generate and output a plurality of carrier waves having frequencies different from each other, the frequencies being predetermined in accordance with a specific factor;
a switch circuit configured to exclusively select and output one of the plurality of carrier waves output from the oscillating circuit in accordance with a control signal input thereto;
a memory storing communication information of each one of the plurality of IC tags, including a resonance frequency assigned thereto; and
a control circuit configured to read from the memory a specific resonance frequency assigned to one of the plurality of second antennas belonging to a target IC tag among the plurality of IC tags, to generate the control signal such that the switch circuit selects, from among the plurality of carrier waves, a specific carrier wave having a frequency, out of the predetermined frequencies, substantially equal to the specific resonance frequency read from the memory, and to transmit the specific carrier wave selected by the switch circuit and data to be transmitted in synchronism with each other to a corresponding one of the plurality of modulating circuits.

12. A data communication apparatus of claim 11, wherein each one of the plurality of first antennas is configured to have a frequency substantially equal to a specific resonance frequency of a corresponding one of the plurality of second antennas and is arranged close to the corresponding one of the plurality of second antennas.

13. A data communication apparatus of claim 11, wherein at least one of the plurality of first antennas corresponding to the at least one IC tag is mounted to a member to which the at least one IC tag is mounted.

* * * * *